(12) United States Patent
Osgouei et al.

(10) Patent No.: US 11,951,626 B2
(45) Date of Patent: Apr. 9, 2024

(54) AUTONOMOUS FLUID MANAGEMENT USING FLUID DIGITAL TWINS

(71) Applicants: Reza Ettehadi Osgouei, Houston, TX (US); Mehrdad Gharib Shirangi, Houston, TX (US); Charles A. Thompson, Jr., Kingwood, TX (US); Eliah Everhard, The Woodlands, TX (US); Jason Norman, Houston, TX (US)

(72) Inventors: Reza Ettehadi Osgouei, Houston, TX (US); Mehrdad Gharib Shirangi, Houston, TX (US); Charles A. Thompson, Jr., Kingwood, TX (US); Eliah Everhard, The Woodlands, TX (US); Jason Norman, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 304 days.

(21) Appl. No.: 17/088,776

(22) Filed: Nov. 4, 2020

(65) Prior Publication Data

US 2022/0134556 A1 May 5, 2022

(51) Int. Cl.
*B25J 9/00* (2006.01)
*B25J 9/16* (2006.01)

(52) U.S. Cl.
CPC ........... *B25J 9/1661* (2013.01); *B25J 9/1671* (2013.01); *B25J 9/1682* (2013.01)

(58) Field of Classification Search
CPC ...... B25J 9/1661; B25J 9/1671; B25J 9/1682; B25J 9/1679; G05B 2219/40202
See application file for complete search history.

(56) References Cited

U.S. PATENT DOCUMENTS

| | | | |
|---|---|---|---|
| 2009/0152163 A1* | 6/2009 | Goldman | C08L 95/00 208/24 |
| 2016/0045841 A1* | 2/2016 | Kaplan | C01B 32/05 429/49 |
| 2017/0364795 A1* | 12/2017 | Anderson | G06N 20/10 |
| 2020/0124630 A1 | 4/2020 | Scheffler et al. | |
| 2020/0133213 A1* | 4/2020 | Park | G06N 5/043 |
| 2020/0225655 A1 | 7/2020 | Cella et al. | |
| 2020/0227178 A1 | 7/2020 | Lombardi et al. | |

FOREIGN PATENT DOCUMENTS

| | | | | |
|---|---|---|---|---|
| WO | 2018106278 A1 | 6/2018 | | |
| WO | WO-2018106278 A1 * | 6/2018 | ............ | E21B 41/00 |

OTHER PUBLICATIONS

International Search Report Issued in International Application No. PCT-US2021-057554 dated Feb. 24, 2022; 9 Pages.
Written Opinion Issued in International Application No. PCT-US2021-057554 dated Feb. 24, 2022; 4 Pages.

* cited by examiner

*Primary Examiner* — Ian Jen
(74) *Attorney, Agent, or Firm* — CANTOR COLBURN LLP

(57) ABSTRACT

Examples described herein provide a computer-implemented method that includes determining, using a digital twin, a task to be performed based at least in part on real-time data. The method further includes initiating at least one of a drone, a collaborative robot, or a warehouse system to perform the task.

20 Claims, 6 Drawing Sheets

AUTONOMOUS FLUID MANAGEMENT USING FLUID DIGITAL TWINS

BACKGROUND

Embodiments described herein relate generally to hydrocarbon exploration and recovery and more particularly to techniques for autonomous fluid management using fluid digital twins.

Inventory management at hydrocarbon exploration and recovery operations consumes significant space and manpower. For example, hydrocarbon exploration and recovery operations utilize structures housing equipment, which is used to manage fluids properties, warehouse mud tanks, mud pumps, surface connections, and the wellbore. Such structures can occupy approximately 85% of space at the hydrocarbon exploration and recovery operations.

SUMMARY

Embodiments of the present invention are directed to autonomous fluid management using fluid digital twins.

A non-limiting example computer-implemented method includes determining, using a digital twin, a task to be performed based at least in part on real-time data. The method further includes initiating at least one of a drone, a collaborative robot, or a warehouse system to perform the task.

A non-limiting example system includes a processing system includes a memory and a processor, the processing system for executing the computer readable instructions, the computer readable instructions controlling the processing device to perform operations. The operations include a processing system includes a memory and a processor, the processing system for executing the computer readable instructions, the computer readable instructions controlling the processing device to perform operations. The operations include determining, using a digital twin, a task to be performed based at least in part on real-time data. The operations further include initiating at least one of a drone, a collaborative robot, or a warehouse system to perform the task.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

Referring now to the drawings wherein like elements are numbered alike in the several figures.

DETAILED DESCRIPTION

According to one or more embodiments described herein, an autonomous fluid management system (AFMS) is provided that uses a "digital twin" to make decisions. The AFMS then uses drone control, collaborative robot control, and/or warehouse system control algorithms to implement the decisions. The use of a digital twin enables controlling and optimizing drilling and completion fluid properties using real-time measurements, historical data, data analytics and trend analysis, and fluids simulations to predict a course of action and respond accordingly.

Traditionally, automated fluid management systems collect (or receive) and process a significant amount of data about various aspects of hydrocarbon exploration and recovery operations. The data can include one or more of manufacturing data (i.e., mud plant data), field data, operational data (such as on a per well or per cycle basis), and the like. Such traditional automated fluid management systems provide drilling fluid properties management including real-time fluid measurements from sensors, probes, and other onsite test equipment as well as automated mud mixing facilities. However, these systems require significant changes to workflow and significant investments in terms of time and capital.

Accordingly, to cure these shortcomings of the prior art, one or more embodiments are described herein for an AFMS that provides autonomy to traditional automated fluid management systems. For example, the AFMS described herein utilizes autonomous devices such as drones, collaborative robots, etc. to collect data and perform tests. The AFMS described herein also utilizes a digital twin to provide decision making and data processing capabilities. As a result, the AFMS can replace traditional manual labor while increasing overall productivity through increased accuracy, precision, and speed. The AFMS therefore increases the time that the hydrocarbon exploration and recovery systems can operate, thereby improving hydrocarbon exploration and recovery technologies.

The present techniques provide certain advantages over the prior art, including flexibility, easy integration, increased up time, and the like. Additional advantages include: an intuitive platform, the ability to be used in different applications and environments, integration of and coordination with work cells, software updates that increase the value of hardware, and the addition of new features and capabilities, among others.

Figure 1A:
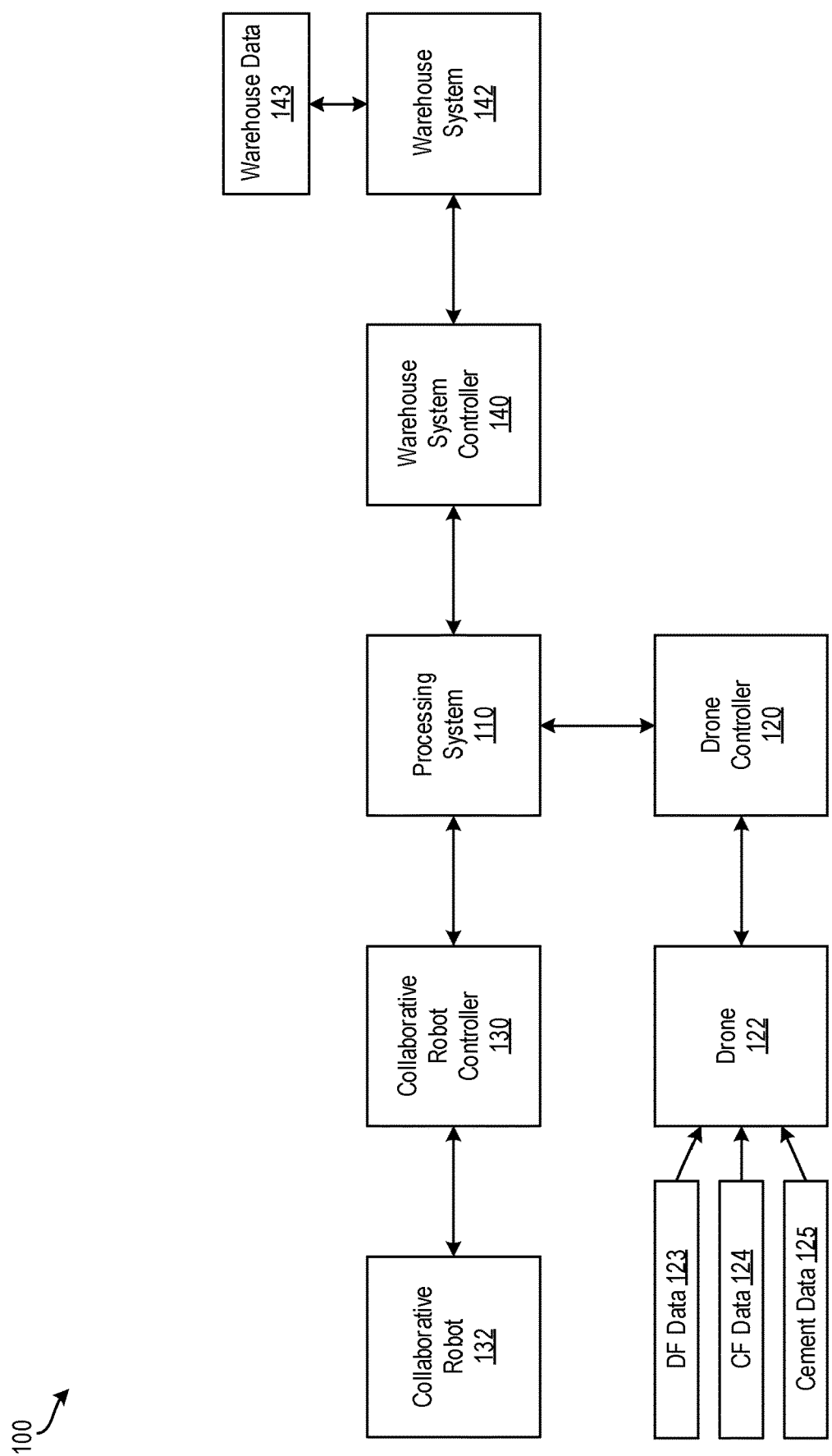
FIG. 1A depicts block diagram of a system for performing autonomous fluid management using a fluid digital twin according to one or more embodiments described herein.
Figure 1B:
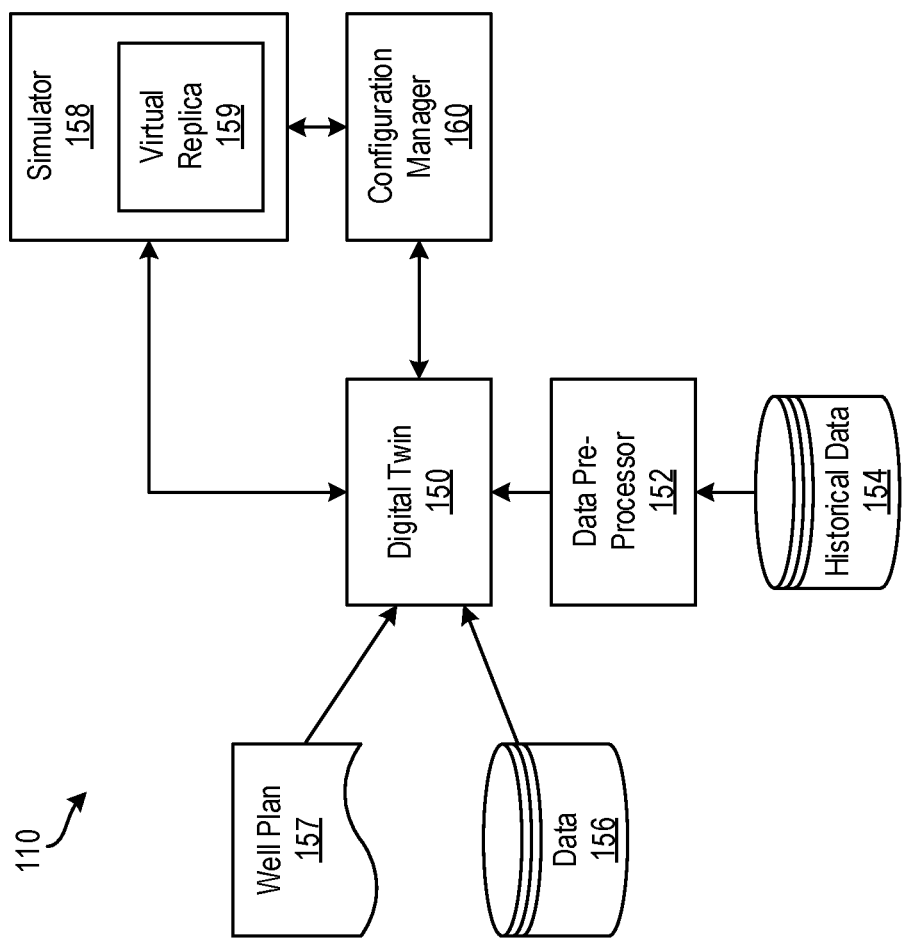
FIG. 1B depicts a block diagram of the processing system of FIG. 1A for performing autonomous fluid management using a fluid digital twin according to one or more embodiments described herein.

FIG. 1A depicts a block diagram of a system 100 for performing autonomous fluid management using one or more fluid digital twins according to one or more embodiments described herein. FIG. 1B depicts a block diagram of the processing system 110 of FIG. 1A for performing autonomous fluid management using fluid digital twins according to one or more embodiments described herein.

The system 100 is associated with a hydrocarbon exploration and recovery operation(s).

The system 100 is now described with reference to FIGS. 1A and 1B. The system 100 includes a processing system 110 (also referred to as an "autonomous fluid management system" or "AFMS"), which, in some examples, performs autonomous fluid management using fluid digital twins. The processing system 110 is shown in FIGS. 1B and 1s described in more detail herein. The processing system 110 is communicatively coupled to controllers for controlling various devices and systems to perform tasks. For example, as shown in FIG. 1A, the processing system 100 is communicatively coupled to a drone controller 120, a collaborative robot controller 130, and a warehouse system controller 140 (collectively referred to as "the controllers" 120, 130, 140). In some examples, the processing system 110 includes the features and functionality of one or more of the controllers 120, 130, 140, while in other examples, the features and functionality of one or more of the controllers 120, 130, 140 is implemented in another device, such as another processing system, as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the controllers described herein can be a combination of hardware and programming. The programming can be processor executable instructions stored on a tangible memory, and the hardware can include a processing device (e.g., the processors 421 of FIG. 4) for executing those instructions. Thus a system memory (e.g., the RAM 424 of FIG. 4) can store program instructions that when executed by the processing device implement one or more of the controllers 120, 130, 140 described herein. Other controllers, engines, modules, etc. can also be utilized to include other features and functionality described in other examples herein.

The processing system 110, as shown in FIG. 1B, uses a digital twin 150 for performing autonomous fluid management. A digital twin is a digital representation used to simulate a real-world process or object. As described herein, digital twins are used for controlling and optimizing drilling and completion fluid properties for hydrocarbon exploration and recovery operations using real-time (or near-real-time) measurements, historical data, data analytics/trend analysis, and fluids simulations to predict a course of action and respond accordingly. The digital twin 150 takes as input data about the real-world process or object desired to be simulated and uses logic (e.g., causality, laws of physics/mathematics, etc.), properties/characteristics of the process or object, and the like to generate simulated output data. The simulated output data can be used to train an artificial intelligence (AI) model.

The digital twin 150 can act as an operational decision-maker. By having a digital twin of the mud of a hydrocarbon exploration and recovery operation, with all the chemicals that are included in the makeup, the digital twin 150 can predict what a chemical addition would do to the fluid. Certain products have synergies with each other and can compound the effect, while others buffer or conflict with each other and mitigate the effects. This can be more easily overcome by having knowledge of the chemical composition of the fluid, as well as the data and knowledge gained from past treatments on similar fluids. In some examples, the digital twin 150 can include the ability to create and execute an action for mud treatment, such as adding lost circulation materials, chemical products, or optimizing fluid equipment performance based on the predicted operational needs based on equipment health and product usage information.

Aspects described herein can utilize machine learning functionality to accomplish the various operations described herein. More specifically, the present techniques can incorporate and utilize rule-based decision making and AI reasoning to accomplish the various operations described herein. The phrase "machine learning" broadly describes a function of electronic systems that learn from data. A machine learning system, engine, or module can include a trainable machine learning algorithm that can be trained, such as in an external cloud environment, to learn functional relationships between inputs and outputs that are currently unknown, and the resulting machine learning model can be used to for decision making for hydrocarbon exploration and recovery operations. In one or more embodiments, machine learning functionality can be implemented using a predictive neural network (PNN) having the capability to be trained to perform a currently unknown function. In machine learning and cognitive science, PNNs are a family of statistical learning models inspired by the biological neural networks of animals, and in particular the brain. PNNs can be used to predict outcomes based on a large number of inputs.

PNNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in PNNs that carry electronic messages between simulated neurons are provided with numeric weights that correspond to the strength or weakness of a given connection. The weights can be adjusted and tuned based on experience, making PNNs adaptive to inputs and capable of learning. For example, a PNN for cardiovascular disease prediction is defined by a set of input neurons that can be activated by patient data. After being weighted and transformed by a function determined by the networks designer, the activation of these input neurons are then passed to other downstream neurons, which are often referred to as "hidden" neurons. This process is repeated until an output neuron is activated. The activated output neuron predicts whether a patient has (or may have a risk of) cardiovascular disease. In the present case, features of objects can be input into a PNN, and the PNN can predict decisions and action for hydrocarbon exploration and recovery operations.

Other types of neural networks can also be implemented. For example, convolutional neural networks (CNN) are a class of deep, feed-forward artificial neural networks that are particularly useful at analyzing visual imagery.

As an example, the digital twin 150 can take as input historical data 154, which can include data collected from one or more historical hydrocarbon exploration and recovery operations. Examples of such historical data 154 can include flow rates, data about drilling fluids, temperature and pressure data, lithology data, resistivity data, acoustic data, and others. The historical data 154 can also include data from prior laboratory tests. The historical data 154 can be pre-processed by the data pre-processor 152. The pre-processing can include sorting, filtering, and other data manipulation techniques. For example, the historical data 154 can be filtered based on type, location, depth, noise, etc. As another example, the data pre-processor 152 can perform feature engineering, transformation, analytics, data mining, etc. The digital twin 150 is then generated using the output of the data pre-processor 152. Although, in some examples, the digital twin 150 is trained using the historical data 154 directly without pre-processing.

Once trained, the digital twin 150 can be used to perform simulations for a hydrocarbon exploration and recovery operation. This enables the digital twin 150 to provide suggestions for what additives, tests, procedures, etc. may be useful. For example, real-time (and/or near-real-time) data (i.e., data 156) are received, such as from the drone 122, the collaborative robot 132, the warehouse system 142, and/or other suitable sources. Real-time uncontrolled (measurement data) and controlled input parameters are fed into the processing system 110 and are incorporated into one or more databases, which can store real-time, near-real-time, and/or historical data. Examples of the data 156 include data from downhole sensors (e.g., pump rate), data from lab results (e.g., collected by the collaborative robot 132), etc. The data 156 are processed using the digital twin 150 that has been trained. The digital twin 150 can also take as input a well plan 157, which provides details about the hydrocarbon exploration and recovery operation. The output of the digital twin 150 may be an additive to be added, a test to be performed, an action or procedure to take, and the like.

The output of the digital twin 150 is provided to a simulator 158 and a configuration manager 160. The simulator 158 simulates hydrocarbon exploration and recovery operations and determines what effect the output of the digital twin 150 has. The simulator 158 includes a collection of algorithms for prediction and characterization of fluid properties and behaviors. The simulator 158 can include models for predicting the effects of controlled events, uncontrolled events and potentially warehouse conditions. The simulator 158 utilizes a virtual replica 159 in examples. The virtual replica 159 enables the simulator 158 to see what a decision (output of the digital twin 150) looks like in action.

The output of the digital twin 150 is also provided to a configuration manager 160. The configuration manager 160 facilitates communications between the drone controller 120, the collaborative robot controller 130, the warehouse system controller 140, and/or any other suitable device or controller to provide the output of the digital twin 150 to the respective controller. This enables the respective controller to implement whatever task, test, or other action indicated by the digital twin 150. In some examples, the drone controller 120 and the collaborative robot controller 130 can communicate directly. For example, the collaborative robot controller 130 can request, via the drone controller 120, that the drone 122 take a particular sample without communicating the request through the processing system 110.

The configuration manager 160 can also perform assessment and execution, data mining, and data analytics. The data mining includes combing through a repository of existing data (e.g., the historical data 154) to determine the effects of uncontrolled and controlled events on historical fluid systems. The data analytics employs statistical algorithms and trend analysis on the real-time data (or near-real-time data) (e.g., the data 156) to derive correlative input effects on outputs using regression, detect anomalous data, cluster data types, etc. to enable machine learning to guide future operational decision making. The assessment and execution utilize the simulator 158, data analytics, and the data 156 to formulate a directive message to be transmitted to one or more of the controllers 120, 130, 140 in an autonomous manner that includes an action corresponding to the directive message transmitted. Actions prescribed and executed by configuration manager 160 are comparable to controlled events as described in more detail herein.

The drone controller 120 controls one or more drones, such as the drone 122. Drones, such as the drone 122, can be used to collect real-time fluid measurements from various sensors (e.g., density, flow rate, etc.). For example, the drone 122 can collect one or more of drilling fluid data 123, completion fluid data 124, cement data 125, and/or any other suitable data. The drone 122 is controlled by the drone controller 120 using a drone control algorithm 320 shown in FIG. 3A and described in more detail herein.

The collaborative robot controller 130 controls one or more collaborative robots, such as the collaborative robot 132. Collaborative robots (or "cobots"), such as the collaborative robot 132, can be used in a laboratory environment to assist a human operator with performing testing and generating results. The collaborative robot 132 is controlled by the collaborative robot controller 130 using a collaborative robot control algorithm 330 shown in FIG. 3B and described in more detail herein.

The warehouse system controller 140 controls one or more warehouse systems, such as the warehouse system 142. Warehouse systems, such as the warehouse system 142, are used to manage and arrange inventory and can store data about the inventory as warehouse data 143. The warehouse system 142 can include various components (or "sub-systems"), such as gantry cranes and robotic arms, to physically move inventory on-demand or proactively. The warehouse system 142 can also integrate with supply chain systems to order inventory. The warehouse system 142 is controlled by the warehouse system controller 140 using a warehouse system control algorithm 340 shown in FIG. 3C and described in more detail herein.

Figure 2:
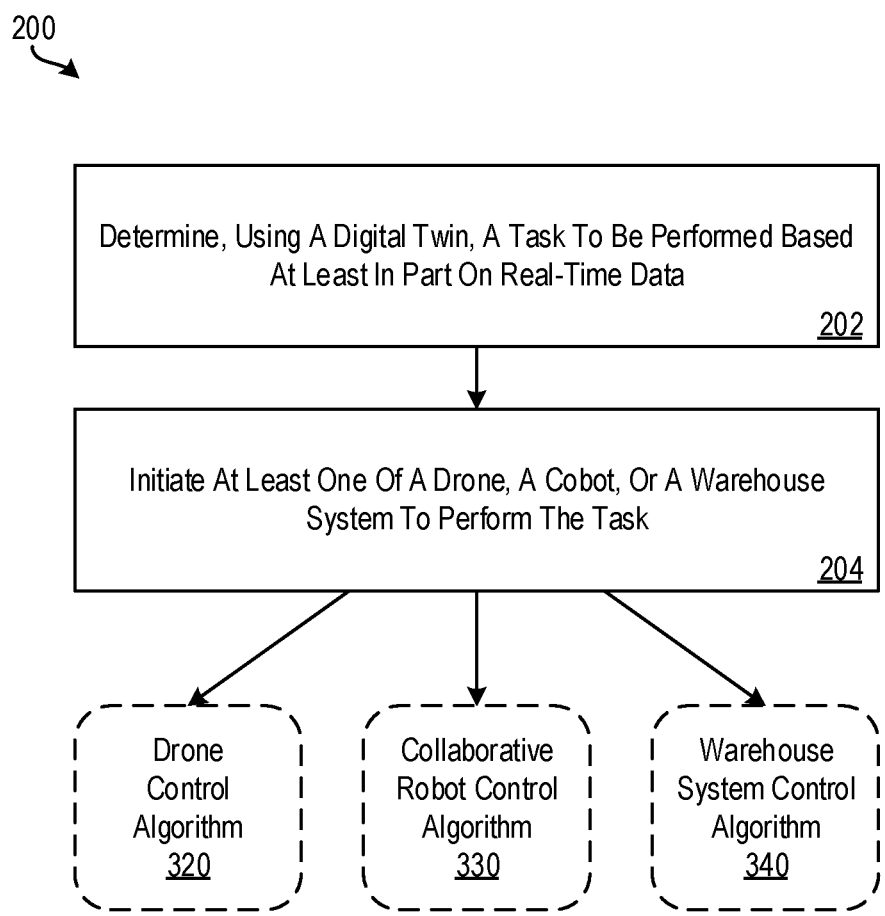
FIG. 2 depicts a flow diagram of a method for autonomous fluid management using a fluid digital twin according to one or more embodiments described herein.

FIG. 2 depicts a flow diagram of a method 200 for autonomous fluid management using fluid digital twins according to one or more embodiments described herein. The method 200 can be implemented by the processing system 110, the processing system 400 of FIG. 4, and/or another suitable device or system.

At block 202, the processing system 110 determines, using the digital twin 150, a task to be performed based at least in part on the data 156. For example, the digital twin 150 can create a digital mixing sheet (or "mix-sheet") in real-time by controlling and optimizing drilling and completion fluid properties using real-time (or near-real-time) measurements (e.g., the data 156), historical data 154, data analytics/trend analysis, and fluids simulations to predict a course of action in the form of tasks, tests, procedures, actions, etc. In another example, the digital mixing sheet can be created manually by a user. Real-time (or near-real-time) fluid properties measurements (e.g., the data 156) from sensors, probes, drones (e.g., the drone 122), collaborative robots (e.g., the collaborative robot 132) can be collected continuously and uploaded to a database storing the data 156. The data 156 capture the effects of uncontrolled events that modify properties of fluids used in hydrocarbon exploration and recovery operations. Examples of such uncontrolled events can include water flow, loss of returns, formation born contaminants, etc. Controlled events also modify fluid properties and are the result of operational decisions that can affect fluid composition and properties. Examples of such controlled events can include chemical product additions, activation and/or modification of solids control equipment, fluid displacements, etc. The digital twin 150 uses the data 156 to determine what actions to take based on properties of fluids used in hydrocarbon exploration and recovery operations.

At block 204, the processing system 110 causes at least one of the drone 122, the collaborative robot 132, or the warehouse system 142 to perform the task. For example, responsive to initiating the drone 120 to perform the task, a drone control algorithm 320 is implemented. As another example, responsive to initiating the drone 132 to perform the task, a collaborative robot control algorithm 330 is implemented. As yet another example, responsive to initiating the warehouse system control algorithm 340 to perform the task, a warehouse system control algorithm is initiated. The control algorithms 320, 330, 340 are depicted in FIGS. 3A, 3B, and 3C respectively and are described in more detail as follows.

Figure 3A:
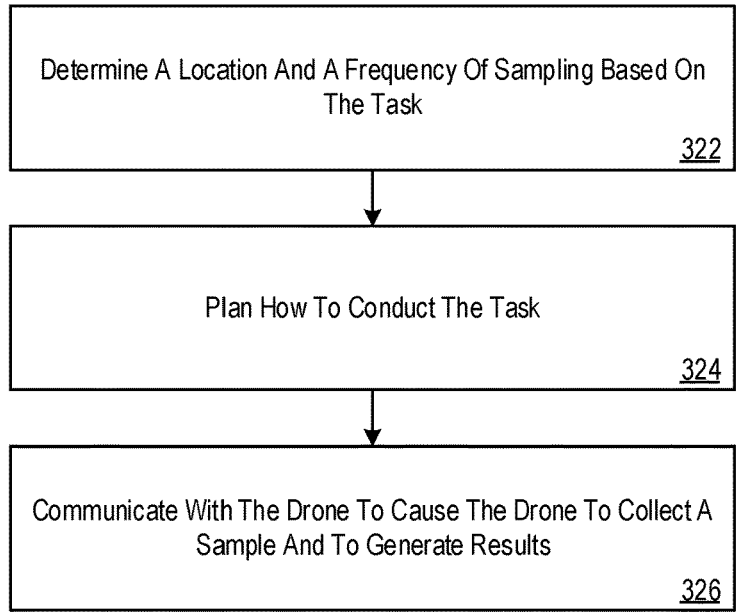
FIG. 3A depicts a flow diagram of a drone control algorithm according to one or more embodiments described herein.

FIG. 3A depicts a flow diagram of a drone control algorithm 320 according to one or more embodiments described herein. In examples, the drone control algorithm 320 is implemented by the drone controller 120, the processing system 110, the processing system 400 of FIG. 4, and/or another suitable device or system. At block 322, the drone controller 120 determines a location and a frequency of sampling based on the task received from the processing system 110. This can include when and where to take physical samples (e.g., a physical mud sample), when and where to collect data, when and where to take photographs, etc. At block 324, the drone controller 120 plans how to conduct the task. For example, the drone controller 120 selects one or more of a plurality of drones (e.g., the drone 120) and dispatches the one or more drones to perform the task. At block 326, the drone controller 120 communicates with the one or more drones to cause the one or more drones to collect a sample and to generate results. For example, samples, data, and/or images collected by the drone 122 are returned to the processing system 110 as results.

Figure 3B:
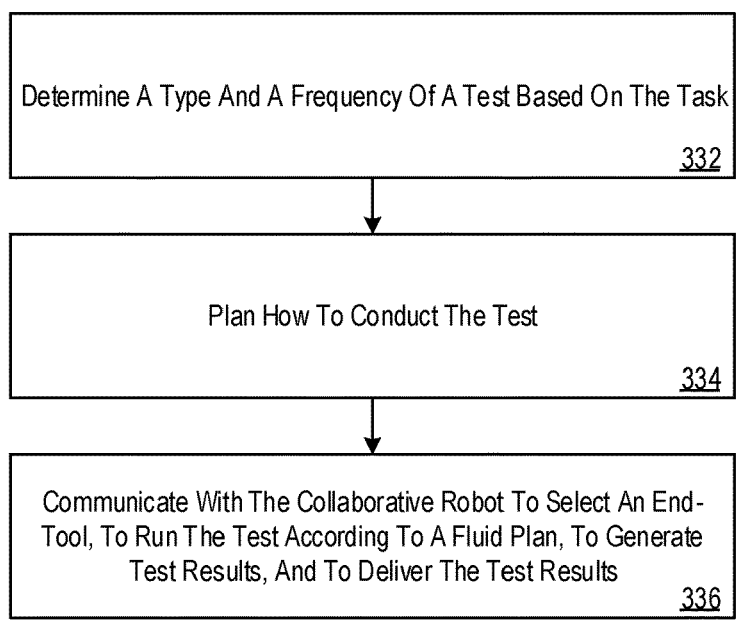
FIG. 3B depicts a flow diagram of a collaborative robot control algorithm according to one or more embodiments described herein.

FIG. 3B depicts a flow diagram of a collaborative robot control algorithm 330 according to one or more embodiments described herein. In examples, the collaborative robot control algorithm 330 is implemented by the collaborative robot controller 130, the processing system 110, the processing system 400 of FIG. 4, and/or another suitable device or system. At block 332, the collaborative robot controller 130 determines a type and a frequency of a test based on the task. For example, a collaborative robot (e.g., the collaborative robot 130) may be able to perform a plurality of tests in a laboratory environment. The collaborative robot controller 130 selects, based on the task, one or more of the plurality of tests for the collaborative robot 130 to perform. At block 334, the collaborative robot controller 130 plans how to conduct the test. At block 336, the collaborative robot controller 130 communicates with the collaborative robot 132 to select an end-tool, to run the test according to a fluid plan, to generate test results, and to deliver the test results.

Figure 3C:
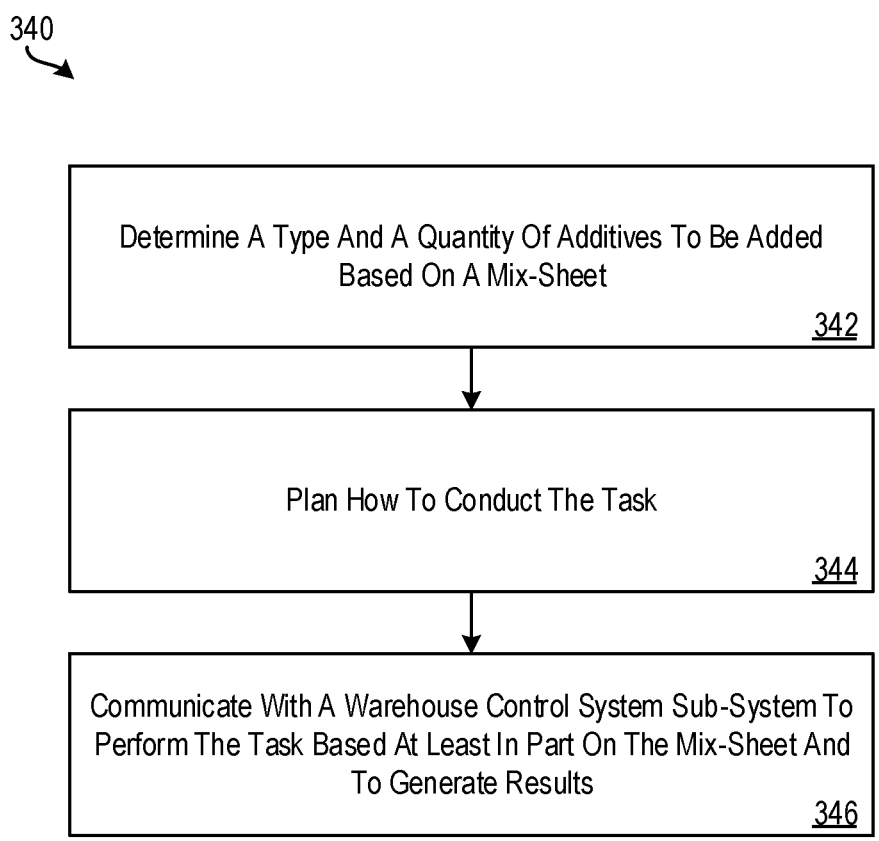
FIG. 3C depicts a flow diagram of a warehouse system control algorithm according to one or more embodiments described herein.

FIG. 3C depicts a flow diagram of a warehouse system control algorithm 340 according to one or more embodiments described herein. In examples, the warehouse system control algorithm 340 is implemented by the warehouse system controller 140, the processing system 110, the processing system 400 of FIG. 4, and/or another suitable device or system. At block 342, the warehouse system controller 140, determines a type and a frequency of additives to be added based on a mix-sheet, and at block 344, the warehouse system controller 140 plans how to conduct the task. For example, if the digital twin 150 determines that a particular additive should be added, the warehouse system controller 140 determines where the additive is located in the warehouse, gathers the additive (autonomously and/or via human interaction), and enables the additive to be delivered to and/or added to the hydrocarbon exploration and recovery operation. At block 346 the warehouse system controller 140, communicates with one or more warehouse control sub-systems (e.g., gantry crane, robot arms, etc.) to perform the task-based at least in part on the mix-sheet and to generate results. For example, a gantry crane can pick a pallet containing the desired additive and move it to a staging area and/or automatically add the additive to a hopper or other vessel associated with the hydrocarbon exploration and recovery operation.

Additional processes also may be included, and it should be understood that the processes depicted in FIGS. 2, 3A, 3B, and 3C represent illustrations, and that other processes may be added or existing processes may be removed, modified, or rearranged without departing from the scope of the present disclosure.

Figure 4:
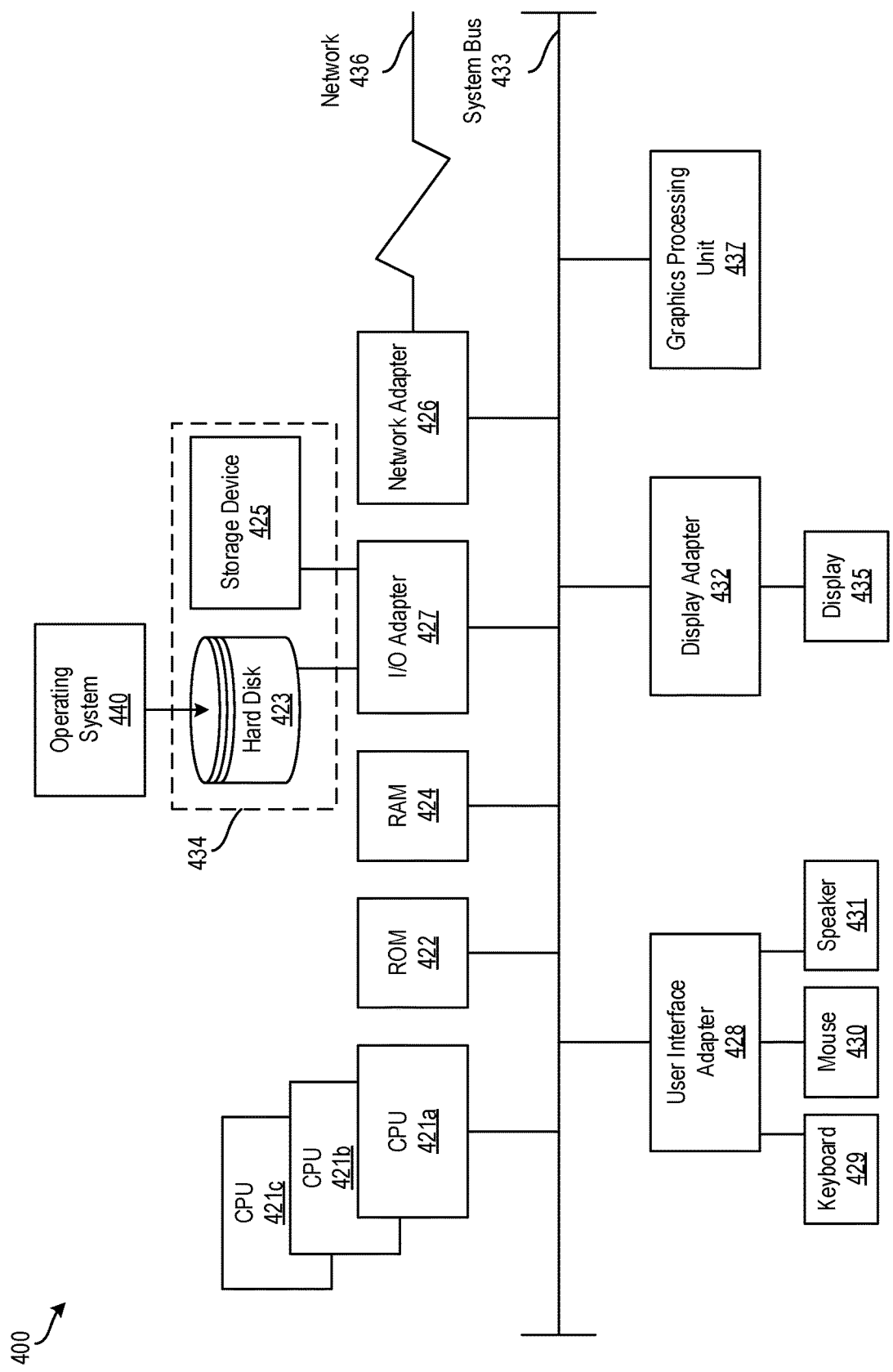
FIG. 4 depicts a block diagram of a processing system for implementing the presently described techniques according to one or more embodiments described herein.

It is understood that one or more embodiments described herein is capable of being implemented in conjunction with any other type of computing environment now known or later developed. For example, FIG. 4 depicts a block diagram of a processing system 400 for implementing the techniques described herein. In examples, processing system 400 has one or more central processing units ("processors" or "processing resources") 421a, 421b, 421c, etc. (collectively or generically referred to as processor(s) 421 and/or as processing device(s)). In aspects of the present disclosure, each processor 421 can include a reduced instruction set computer (RISC) microprocessor. Processors 421 are coupled to system memory (e.g., random access memory (RAM) 424) and various other components via a system bus 433. Read only memory (ROM) 422 is coupled to system bus 433 and may include a basic input/output system (BIOS), which controls certain basic functions of processing system 400.

Further depicted are an input/output (I/O) adapter 427 and a network adapter 426 coupled to system bus 433. I/O adapter 427 may be a small computer system interface (SCSI) adapter that communicates with a hard disk 423 and/or a storage device 425 or any other similar component. I/O adapter 427, hard disk 423, and storage device 425 are collectively referred to herein as mass storage 434. Operating system 440 for execution on processing system 400 may be stored in mass storage 434. The network adapter 426 interconnects system bus 433 with an outside network 436 enabling processing system 400 to communicate with other such systems.

A display (e.g., a display monitor) 435 is connected to system bus 433 by display adapter 432, which may include a graphics adapter to improve the performance of graphics intensive applications and a video controller. In one aspect of the present disclosure, adapters 426, 427, and/or 432 may be connected to one or more I/O busses that are connected to system bus 433 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 433 via user interface adapter 428 and display adapter 432. A keyboard 429, mouse 430, and speaker 431 may be interconnected to system bus 433 via user interface adapter 428, which may include, for example, a Super I/O chip integrating multiple device adapters into a single integrated circuit.

In some aspects of the present disclosure, processing system 400 includes a graphics processing unit 437. Graphics processing unit 437 is a specialized electronic circuit designed to manipulate and alter memory to accelerate the creation of images in a frame buffer intended for output to a display. In general, graphics processing unit 437 is very efficient at manipulating computer graphics and image processing, and has a highly parallel structure that makes it more effective than general-purpose CPUs for algorithms where processing of large blocks of data is done in parallel.

Thus, as configured herein, processing system 400 includes processing capability in the form of processors 421, storage capability including system memory (e.g., RAM 424), and mass storage 434, input means such as keyboard 429 and mouse 430, and output capability including speaker 431 and display 435. In some aspects of the present disclosure, a portion of system memory (e.g., RAM 424) and mass storage 434 collectively store the operating system 440 to coordinate the functions of the various components shown in processing system 400.

Example embodiments of the disclosure include or yield various technical features, technical effects, and/or improvements to technology. Example embodiments of the disclosure provide technical solutions for automonous decision making based on real-time and historical data about hydrocarbon exploration and recovery operations using a digital twin in combination with a drone, a collaborative robot, and/or a warehouse system. These technical solutions provide the ability for hydrocarbon exploration and recovery operations to improve production, for example, by determining when to add certain additives based on data collected by a drone at a hydrocarbon exploration and recovery operation and/or based on laboratory results generated by a collaborative robot. The present techniques also automatically manage fluid properties and consequently optimize rate of penetration of a hydrocarbon exploration and recover operation. Accordingly, the present techniques improve hydrocarbon exploration and recovery operations by improving productivity through accuracy, precision, and speed.

Set forth below are some embodiments of the foregoing disclosure:

Embodiment 1: A method comprising: determining, using a digital twin, a task to be performed based at least in part on real-time data; and initiating at least one of a drone, a collaborative robot, or a warehouse system to perform the task.

Embodiment 2: A method according to any prior embodiment further comprising, responsive to initiating the drone to perform the task, implementing a drone control algorithm.

Embodiment 3: A method according to any prior embodiment wherein the drone control algorithm comprises: determining a location and frequency of sampling based on the task; planning how to conduct the task; and communicating with the drone to cause the drone to collect a sample and to generate results.

Embodiment 4: A method according to any prior embodiment further comprising, responsive to initiating the collaborative robot to perform the task, implementing a collaborative robot control algorithm.

Embodiment 5: A method according to any prior embodiment wherein the collaborative robot control algorithm comprises: determining a type and a frequency of a test based on the task; planning how to conduct the test; and communicating with the collaborative robot to select an end-tool, to run the test according to a fluid plan, to generate test results, and to deliver the test results.

Embodiment 6: A method according to any prior embodiment further comprising, responsive to initiating the warehouse system to perform the task, implementing a warehouse system control algorithm.

Embodiment 7: A method according to any prior embodiment wherein the warehouse system control algorithm comprises: creating a mix-sheet; determining a type and a quantity of additives to be added based on the mix-sheet; planning how to conduct the task; and communicating with a warehouse control system sub-system to perform the task based at least in part on the mix-sheet and to generate results.

Embodiment 8: A method according to any prior embodiment further comprising, prior to initiating the at least one of the drone, the collaborative robot, or the warehouse system to perform the task, simulating the task to validate the task.

Embodiment 9: A method according to any prior embodiment further comprising training the digital twin based at least in part on historical data.

Embodiment 10: A method according to any prior embodiment further comprising, subsequent to the task being performed, determining, using the digital twin, a new task to be performed based at least in part on results from the task being performed.

Embodiment 11: A system comprising a processing system comprising a memory and a processor, the processing system for executing the computer readable instructions, the computer readable instructions controlling the processing device to perform operations comprising: determining, using a digital twin, a task to be performed based at least in part on real-time data; and initiating at least one of a drone, a collaborative robot, or a warehouse system to perform the task.

Embodiment 12: A system according to any prior embodiment, wherein the operations further comprise, responsive to initiating the drone to perform the task, implementing a drone control algorithm.

Embodiment 13: A system according to any prior embodiment, wherein the drone control algorithm comprises: determining a location and frequency of sampling based on the task; planning how to conduct the task; and communicating with the drone to cause the drone to collect a sample and to generate results.

Embodiment 14: A system according to any prior embodiment, wherein the operations further comprise, responsive to initiating the collaborative robot to perform the task, implementing a collaborative robot control algorithm.

Embodiment 15: A system according to any prior embodiment, wherein the collaborative robot control algorithm comprises: determining a type and a frequency of a test based on the task; planning how to conduct the test; and communicating with the collaborative robot to select an end-tool, to run the test according to a fluid plan, to generate test results, and to deliver the test results.

Embodiment 16: A system according to any prior embodiment, wherein the operations further comprise, responsive to initiating the warehouse system to perform the task, implementing a warehouse system control algorithm.

Embodiment 17: A system according to any prior embodiment, wherein the warehouse system control algorithm comprises: creating a mix-sheet; determining a type and a quantity of additives to be added based on the mix-sheet; planning how to conduct the task; and communicating with a warehouse control system sub-system to perform the task based at least in part on the mix-sheet and to generate results.

Embodiment 18: A system according to any prior embodiment, wherein the operations further comprise, prior to initiating the at least one of the drone, the collaborative robot, or the warehouse system to perform the task, simulating the task to validate the task.

Embodiment 19: A system according to any prior embodiment, wherein the operations further comprise training the digital twin based at least in part on historical data.

Embodiment 20: A system according to any prior embodiment, wherein the operations further comprise, subsequent to the task being performed, determining, using the digital twin, a new task to be performed based at least in part on results from the task being performed.

The use of the terms "a" and "an" and "the" and similar referents in the context of describing the present disclosure (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the present disclosure has been described with reference to an exemplary embodiment or embodiments, it will be understood by those skilled in the art that various changes can be made and equivalents can be substituted for elements thereof without departing from the scope of the present disclosure. In addition, many modifications can be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims. Also, in the drawings and the description, there have been disclosed exemplary embodiments of the present disclosure and, although specific terms can have been employed, they are unless otherwise stated used in a generic and descriptive sense only and not for purposes of limitation, the scope of the present disclosure therefore not being so limited.

What is claimed is:

1. A method comprising:
   determining, using a digital twin acting as an operational decision-maker, a task to be performed based at least in part on real-time data, the task comprising autonomously controlling at least one of a drilling fluid property of a drilling fluid by controlling a chemical composition of the drilling fluid or a completion fluid property of a completion fluid by controlling a chemical composition of the completion fluid at a hydrocarbon production or recovery operations facility;
   simulating performance of the task using a virtual replica that virtually replicates actions in the performance of the task; and
   initiating at least one of a drone, a collaborative robot, or a warehouse system to perform the task.

2. The method of claim 1, further comprising, responsive to initiating the drone to perform the task, implementing a drone control algorithm.

3. The method of claim 2, wherein the drone control algorithm comprises:
   determining a location and frequency of sampling based on the task to obtain data related to the at least one of the drilling fluid property or the completion fluid property;
   planning the task; and
   communicating with the drone to cause the drone to collect a sample and to generate results.

4. The method of claim 1, further comprising, responsive to initiating the collaborative robot to perform the task, implementing a collaborative robot control algorithm.

5. The method of claim 4, wherein the collaborative robot control algorithm comprises:
   determining a type and a frequency of a test based on the task;
   planning the test; and
   communicating with the collaborative robot to select an end-tool, to run the test according to a fluid plan, to generate test results, and to deliver the test results.

6. The method of claim 1, further comprising, responsive to initiating the warehouse system to perform the task, implementing a warehouse system control algorithm.

7. The method of claim 6, wherein the warehouse system control algorithm comprises:
   creating a mix-sheet by determining a type and a quantity of additives to be added to at least one of the drilling fluid or the completion fluid based on data obtained by the drone related to the at least one of the drilling fluid property or the completion fluid property;
   planning the task based on the mix-sheet; and
   communicating with a warehouse control system subsystem to implement the mix-sheet and to generate results.

8. The method of claim 1, further comprising, prior to initiating the at least one of the drone, the collaborative robot, or the warehouse system to perform the task, simulating the task to validate the task.

9. The method of claim 1, further comprising training the digital twin based at least in part on historical data collected from one or more hydrocarbon exploration and/or recovery operations.

10. The method of claim 1, further comprising, subsequent to the task being performed, determining, using the digital twin, a new task to be performed based at least in part on results from the task being performed.

11. A system comprising:
   a processing system comprising a memory and a processor, the processing system for executing computer readable instructions, the computer readable instructions controlling a processing device to perform operations comprising:
      determining, using a digital twin acting as an operational decision-maker, a task to be performed based at least in part on real-time data, the task comprising autonomously controlling at least one of a drilling fluid property of a drilling fluid by controlling a chemical composition of the drilling fluid or a completion fluid property of a completion fluid by controlling a chemical composition of the completion fluid at a hydrocarbon production or recovery operations facility;
      simulating performance of the task using a virtual replica that virtually replicates actions in the performance of the task; and
      initiating at least one of a drone, a collaborative robot, or a warehouse system to perform the task.

12. The system of claim 11, wherein the operations further comprise, responsive to initiating the drone to perform the task, implementing a drone control algorithm.

13. The system of claim 12, wherein the drone control algorithm comprises:

determining a location and frequency of sampling based on the task to obtain data related to the at least one of the drilling fluid property or the completion fluid property;

planning the task; and communicating with the drone to cause the drone to collect a sample and to generate results.

14. The system of claim 11, wherein the operations further comprise, responsive to initiating the collaborative robot to perform the task, implementing a collaborative robot control algorithm.

15. The system of claim 14, wherein the collaborative robot control algorithm comprises:

determining a type and a frequency of a test based on the task;

planning the test; and communicating with the collaborative robot to select an end-tool, to run the test according to a fluid plan, to generate test results, and to deliver the test results.

16. The system of claim 11, wherein the operations further comprise, responsive to initiating the warehouse system to perform the task, implementing a warehouse system control algorithm.

17. The system of claim 16, wherein the warehouse system control algorithm comprises:

creating a mix-sheet by determining a type and a quantity of additives to be added to at least one of the drilling fluid or the completion fluid based on data obtained by the drone related to the at least one of the drilling fluid property or the completion fluid property;

planning the task based on the mix-sheet; and communicating with a warehouse control system subsystem to implement the mix-sheet and to generate results.

18. The system of claim 11, wherein the operations further comprise, prior to initiating the at least one of the drone, the collaborative robot, or the warehouse system to perform the task, simulating the task to validate the task.

19. The system of claim 11, wherein the operations further comprise training the digital twin based at least in part on historical data collected from one or more hydrocarbon exploration or recovery operations.

20. The system of claim 11, wherein the operations further comprise, subsequent to the task being performed, determining, using the digital twin, a new task to be performed based at least in part on results from the task being performed.

* * * * *